(12) United States Patent
Lackey

(10) Patent No.: US 7,201,306 B1
(45) Date of Patent: Apr. 10, 2007

(54) MULTIPLE PURPOSE NEWSPAPER BOX

(75) Inventor: Robert W. Lackey, Hickory, NC (US)

(73) Assignee: Home Impressions, Inc., Hickory, NC (US)

( * ) Notice: Subject to any disclaimer, the term of this patent is extended or adjusted under 35 U.S.C. 154(b) by 0 days.

(21) Appl. No.: 11/542,080

(22) Filed: Oct. 3, 2006

(51) Int. Cl.
*A47B 97/08* (2006.01)

(52) U.S. Cl. .................... 232/1 C; 232/17; 232/45; 47/66.6

(58) Field of Classification Search ............... 232/1 C, 232/17, 45; 99/29–32; 47/66.6
See application file for complete search history.

(56) References Cited

U.S. PATENT DOCUMENTS

| | | | | |
|---|---|---|---|---|
| 4,181,250 A | * | 1/1980 | Withrow | 232/44 |
| 4,905,890 A | * | 3/1990 | Larsen et al. | 232/1 C |
| D313,105 S | * | 12/1990 | Klahre | D99/29 |
| D322,418 S | * | 12/1991 | White | D11/144 |
| 5,465,902 A | * | 11/1995 | Hanson | 232/33 |
| 5,593,059 A | * | 1/1997 | Neilson | 220/229 |
| 6,032,808 A | * | 3/2000 | Henson | 211/85.23 |
| D460,718 S | * | 7/2002 | Beattie | D11/155 |
| 6,513,284 B1 | * | 2/2003 | Sandlin | 47/66.6 |
| D526,759 S | * | 8/2006 | Papernik | D99/29 |
| 7,104,436 B2 | * | 9/2006 | Lackey et al. | 232/1 C |
| 2004/0245328 A1 | * | 12/2004 | Schaper et al. | 232/10 |
| 2005/0184142 A1 | * | 8/2005 | Brown | 232/17 |

* cited by examiner

*Primary Examiner*—William L. Miller
(74) *Attorney, Agent, or Firm*—Charles L. Schwab; Nexsen Pruet, LLC

(57) ABSTRACT

A newspaper box is designed so that is may be easily converted to a planter. Laterally confronting parallel recesses on the confronting sides of the side walls of the newspaper box near it open end are adapted to receive a snap in closure panel for converting the newspaper box to a planter.

5 Claims, 4 Drawing Sheets

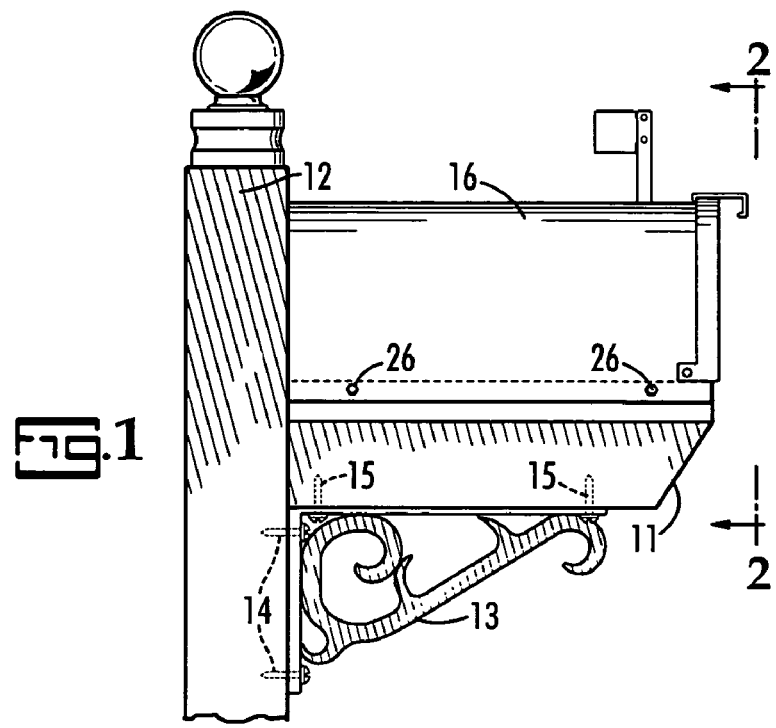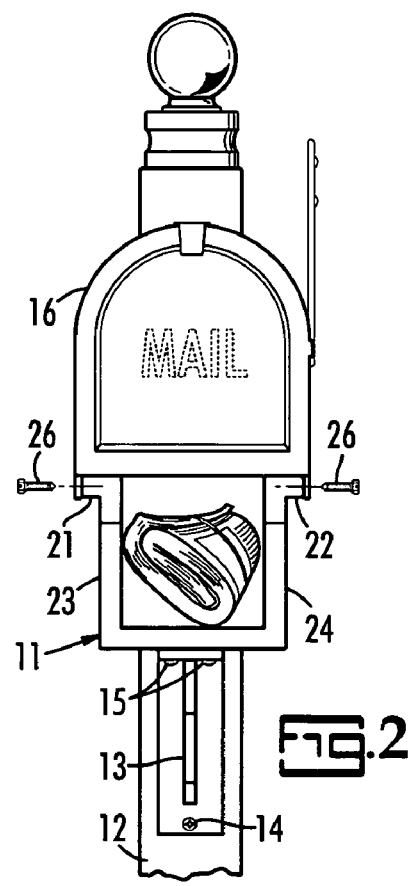

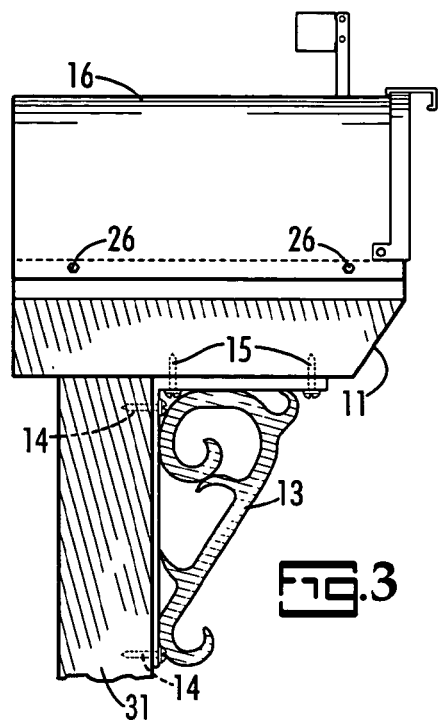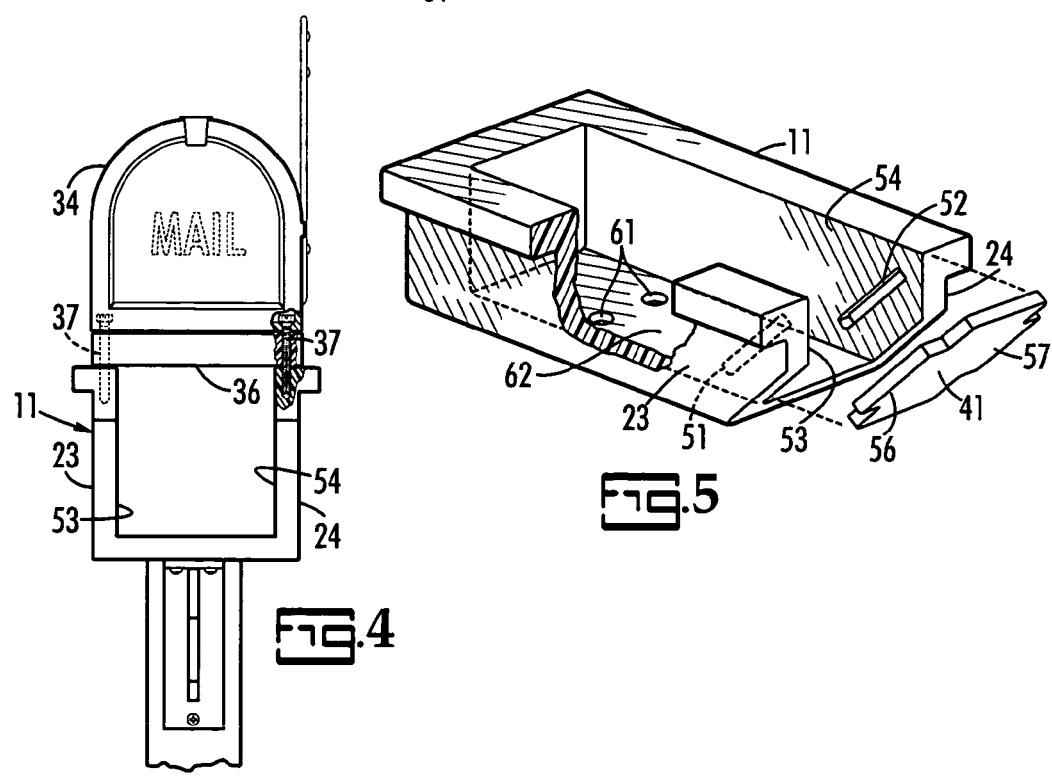

MULTIPLE PURPOSE NEWSPAPER BOX

BACKGROUND OF THE INVENTION

Rural mailboxes are traditionally placed on upright posts adjacent a road providing access to the rural residence. In order to improve the aesthetics of the mailbox installation, residents have planted flowers and vines near it and have added décor to the supporting post. Rural delivery of the newspaper has given rise to the use of a newspaper box which is most often placed just below the mail box. Although adding the newspaper box changes the appearance somewhat; efforts to improve the appearance of the postal and newspaper delivery installation have continued.

SUMMARY OF THE INVENTION

An object of this invention is to make the postal and newspaper installations pleasant to view. It is a further object of the invention to construct a newspaper box in a manner that readily permits its alternate use as a planter. The newspaper box is so constructed that it is usable to directly support a mailbox or to support a mounting board which in turn supports a mail box. The newspaper box includes confronting recesses on the interior sides of its side walls, near its open end, in which a removable end panel can be installed to convert the newspaper box to a planter.

BRIEF DESCRIPTION OF THE DRAWINGS

The invention is illustrated in the accompanying drawings, in which:

FIG. 1 is a side view of a newspaper box mounted on a side of a post and supporting a mail box;

FIG. 2 is a view taken on the line 2—2 in FIG. 1;

FIG. 3 is a side view of a newspaper box mounted on the top of a support post and supporting a mail box;

FIG. 4 is an end view of a newspaper box mounted on a post and supporting a mounting board on which a mail box is supported;

FIG. 5 is an exploded perspective view of the newspaper box and a removable snap in end panel;

DETAILED DESCRIPTION OF THE INVENTION

Figure 6:
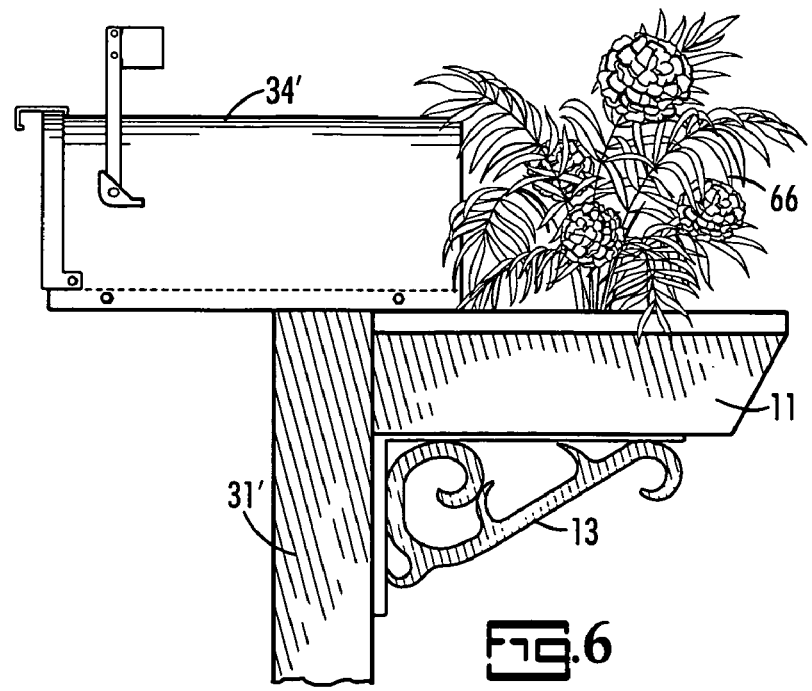
FIG. 6 is a side view of a mailbox supported on top of a post and newspaper box converted to a planter mounted on a side of the post.

Referring to FIGS. 1 and 2 a newspaper box 11 is mounted on one side of a square section post 12 by a decorative bracket 13. The bracket 13 is secured to the post and newspaper box 11 by fasteners, such as screws 14 and 15. A mailbox 16 is secured to laterally outward extending ledges 21, 22 at the upper ends of the upright parallel side walls 23, 24, respectively, of the newspaper box 11 by releasable fasteners or screws 26. The mailbox includes an interior for receiving mail, and a door for access to the interior.

FIG. 3 shows the newspaper box 111 and mailbox 16 mounted on top of a post 31. The newspaper box 11 is secured to the post 31 by the decorative bracket 13 which has been repositioned in relation to the post 31 and newspaper box 11 as compared to its position in FIGS. 1 and 2.

FIG. 4 is a front view showing the newspaper box 11 supporting a narrower mailbox 34. The mailbox 34 and a mounting board 36 are secured to the walls 23, 24 of the newspaper box 11 by vertically disposed screws 37.

The exploded perspective view in FIG. 5 shows details of construction of the newspaper box 11 and a releasably insertable end panel 41 used to convert the newspaper box 11 to a planter as shown in FIGS. 6, 7, 8 and 9. A pair of parallel upwardly slanting and laterally confronting slots or recesses 51, 52 are formed in the interior confronting surfaces or sides 53, 54 of the side walls 23, 24 of the newspaper box 11 near its open end. The upwardly extending recesses terminate short of the top and bottom of the sides 53, 54 of the side walls 23, 24. The newspaper box 11 is made of a somewhat resiliently flexible material, such a plastic, which permits the upper front ends of the walls 23, 24 to be manually spread apart a sufficient distance to insert the tabs 56, 57 of the panel 41 to be inserted into the recesses 51, 52, thereby closing off the normally open end of the newspaper box 11. In normal use of the newspaper box 11, the recesses 51, 52 are somewhat hidden from view and do not adversely affect its appearance. A pair of drain holes are 61 are provided in the bottom wall 62 of the newspaper box 11 which are needed when the latter is used as a planter. The drain holes 61 are also effective in draining any moisture, as from a driving rain, that may enter the newspaper box 11 in its normal use.

Figure 7:
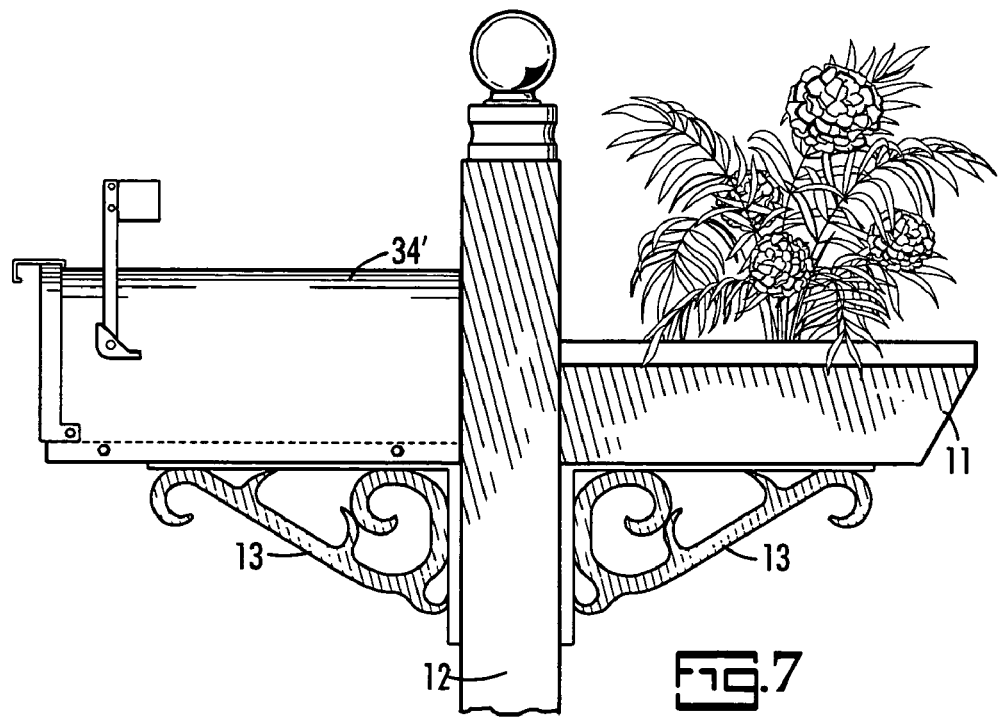
FIG. 7 shows a mailbox together with a newspaper box converted to a planter which are mounted on opposite sides of a post.
Figure 8:
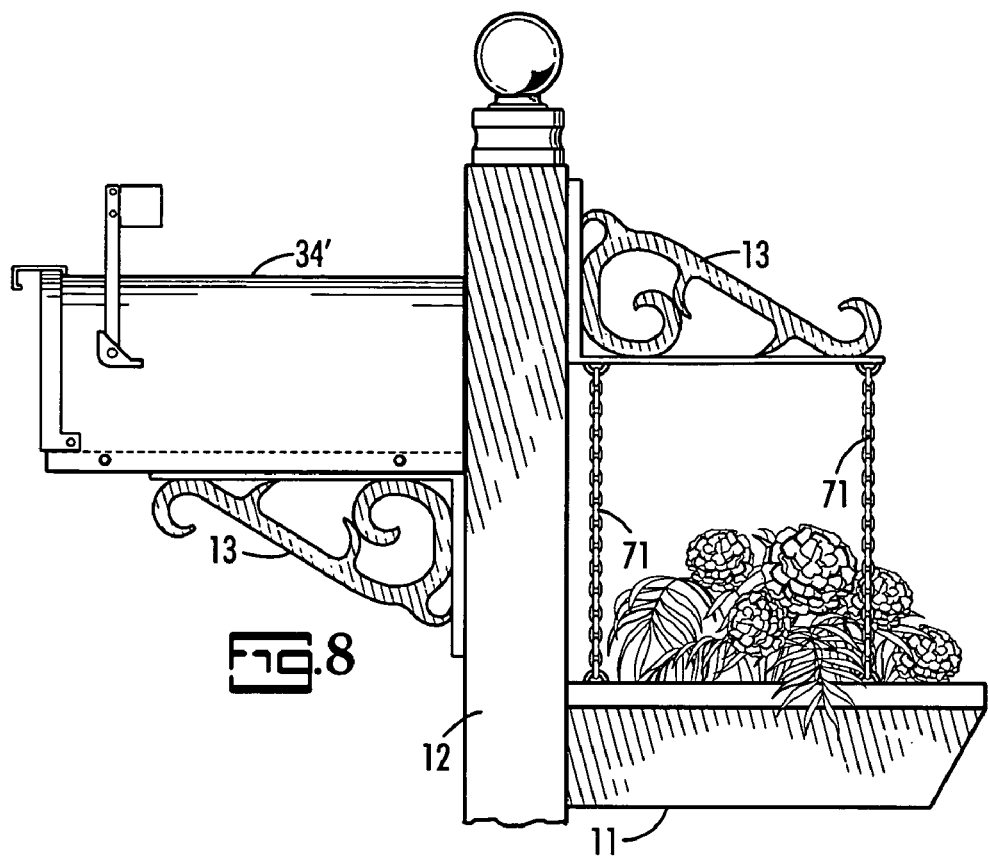
FIG. 8 shows a mailbox mounted on one side of a post and a newspaper box converted to a planter hanging from a bracket at the opposite side of the post.
Figure 9:
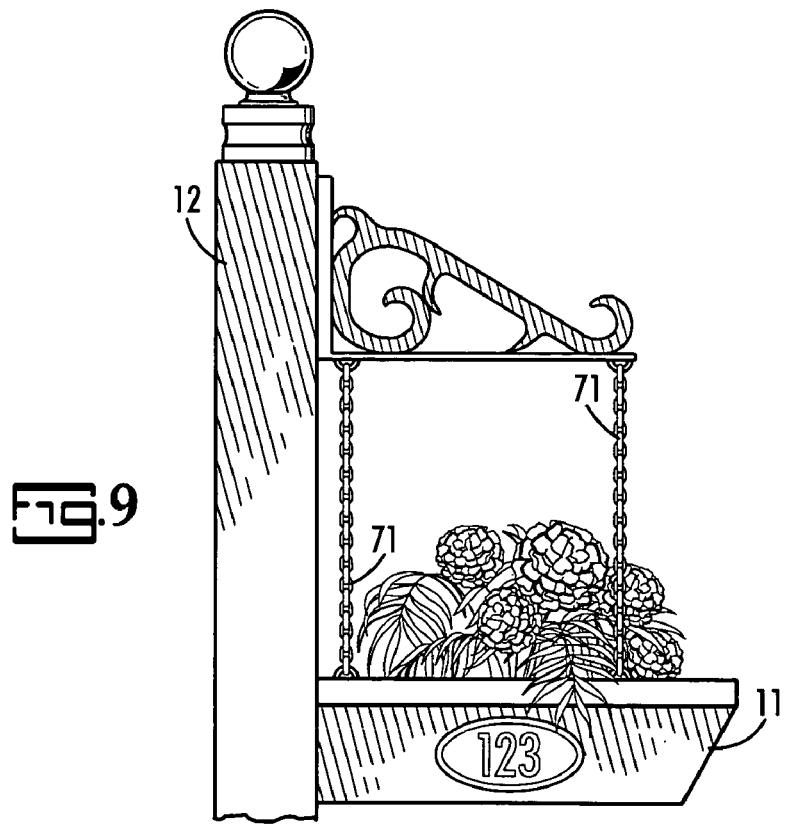
FIG. 9 shows a post with a bracket supporting a newspaper box which has been converted to a planter.

FIGS. 6, 7, 8 and 9 show various ways the converted newspaper box 11 can be used as a planter; that is, with the end panel 41 snapped into the recesses 51, 52. FIG. 6 shows a mailbox 34' mounted on top of a square section wooden post 31' with a rear portion of the mailbox overhanging the post 31'. A newspaper box 11 converted to a planter, by insertion of the panel 41 and addition of a plant 66 and soil or potting mix, is mounted by the bracket 13 beneath the overhanging rear portion of the mail box so as to extend from the post 31' in a direction opposite to the direction in which the mailbox 34' faces. FIG. 7 shows the mailbox 34' and the newspaper box 11, now planter, mounted on opposite sides of the post 12 by brackets 13. FIG. 8 shows a mail box 34' mounted by a bracket 13 to one side of the post 12 and a newspaper box 11 converted to a planter hanging by chains 71 from a bracket 13 at the opposite side of the post 12. FIG. 9 shows the converted newspaper box 11, now planter, suspended by chains 71 from a bracket 13 secured to the post 12 without an accompanying mail box. It should be understood that the mailboxes 34' shown in FIGS. 7 and 8 could be replaced with a combined newspaper box and mailbox as shown in FIGS. 1 through 4.

The newspaper box illustrated and described herein permits the rural resident to add beauty to the otherwise drab mailbox installation in an economical and convenient manner. By designing the newspaper box for dual usage, benefits are afforded to the manufacturer, the retail merchant and the purchaser. Since most rural residences need a newspaper box, a high quantity production is anticipated which permits a relatively low retail price. Thus the retail price of the newspaper box used as a planter can be competitive to other planters that a retail customer might purchase. The retail merchant is afforded increased sales without needing significant addition floor space for product display.

What is claimed is:

1. In combination, a multipurpose newspaper box, a mailbox and a support, said combination comprising said mailbox including an interior for receiving mail, and a door for access to said interior; said newspaper box adapted for connection to said mailbox and comprising:

a pair of laterally spaced parallel upright side walls having front and rear ends, an upright back wall secured to said rear ends of said side walls, a bottom wall secured to said side and back walls, said walls defining said newspaper box with a closed rear end and an open front end, and a pair of upwardly extending laterally confronting recesses in said side walls adjacent their respective front ends; a closure panel adapted to substantially close the open front end of said newspaper box to convert said newspaper box to a planter when said mailbox is removed from said newspaper box; wherein said recesses terminate short of the top of said side walls and wherein said closure panel includes laterally opposite end portions complementary to said recesses which snap into said recesses to form a fixed front wall.

2. The combination of claim 1 wherein said bottom wall includes drainage holes.

3. The newspaper box of claim 1 wherein said combination supports said mailbox when connected thereto.

4. In combination, a mailbox and a container adapted for use as a newspaper box or as a planter, said combination comprising:

said mailbox including an interior for receiving mail, and a door for access to said interior; said container comprising:

a pair of laterally spaced parallel upright side walls extending between front and rear ends and having upper edges, respectively, adapted for connection to said mail box and having lower edges, respectively, said side walls having confronting laterally inner sides;

a bottom wall rigidly secured to said lower edges of said side and rear walls, an upright rear wall extending between and rigidly secured to said rear ends of said side walls and to said bottom wall, said walls forming said newspaper box with a closed rear end and an open front end, and a pair of confronting recesses formed in said laterally inner sides of said side walls near their front ends, said recesses extending in a generally upward direction; a closure panel adapted to substantially close the open front end of the newspaper box to convert said newspaper box to said planter when said mailbox is removed from said newspaper box, said closure panel dimensioned to extend laterally between said side walls with its laterally opposite ends snapping into said recesses, respectively, to form a fixed front wall and thereby convert said newspaper box to said planter.

5. The combination of claim 4 wherein said bottom wall includes water drain holes.

* * * * *